June 6, 1967  S. A. MINERA  3,323,571
FRUIT STEMMER AND METHOD
Filed Dec. 14, 1964  5 Sheets-Sheet 1
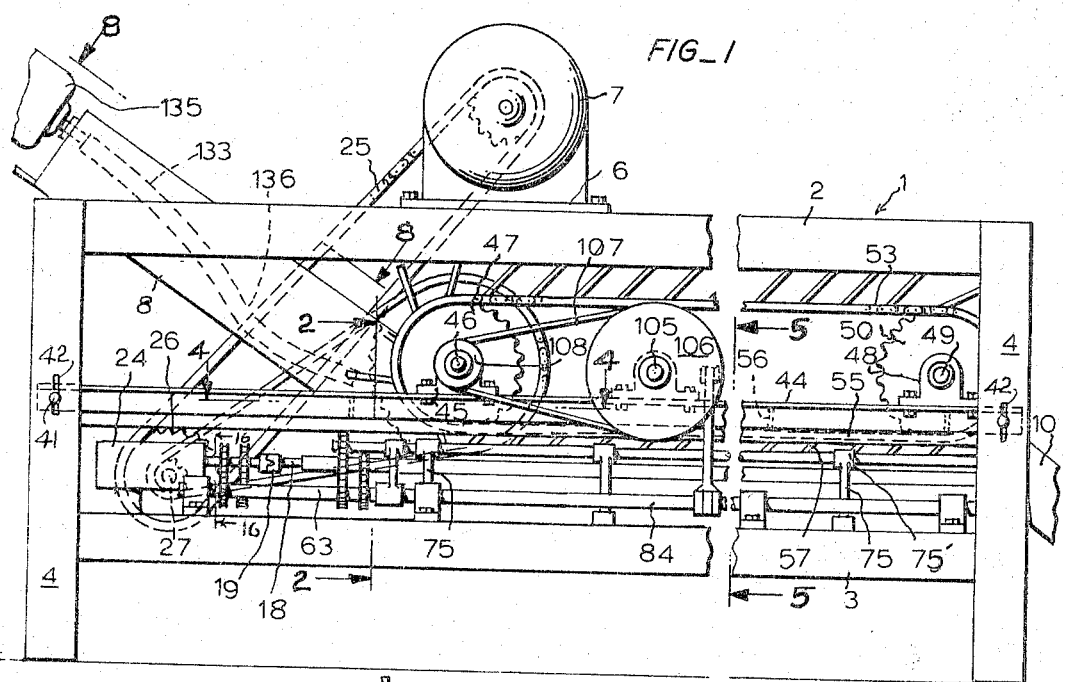
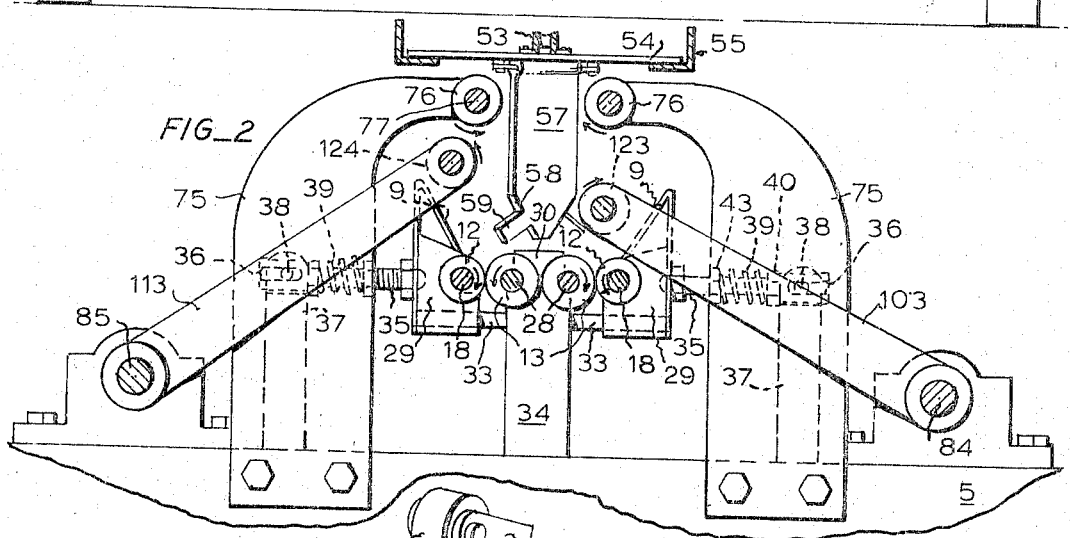
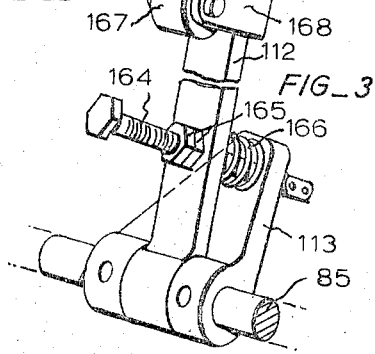
INVENTOR.
SALVADOR A. MINERA
BY
*Boyken, Mohler & Foster*
ATTORNEYS June 6, 1967  S. A. MINERA  3,323,571
FRUIT STEMMER AND METHOD
Filed Dec. 14, 1964  5 Sheets-Sheet 2
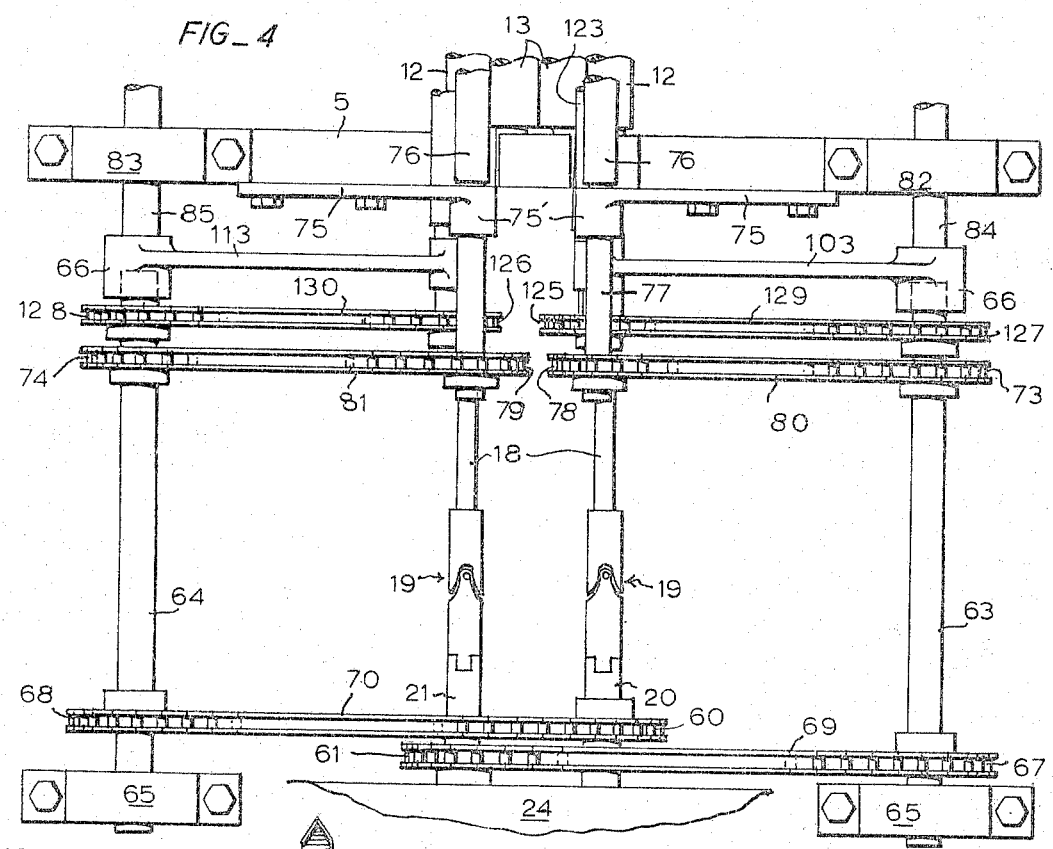
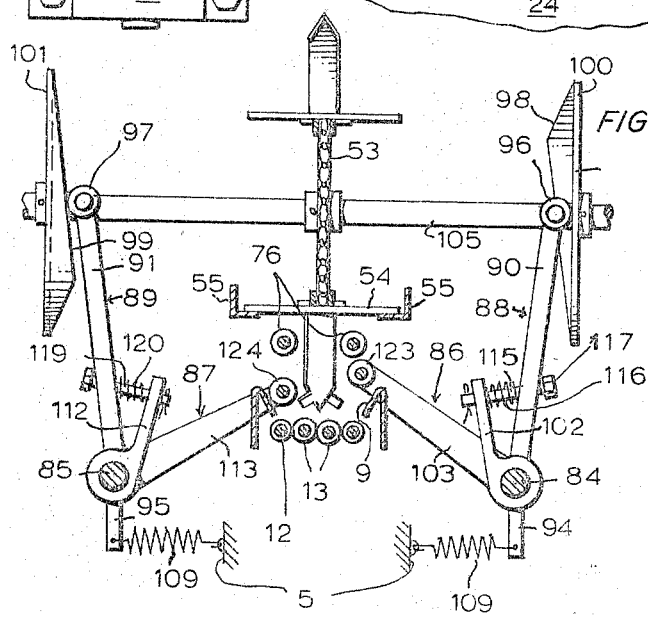
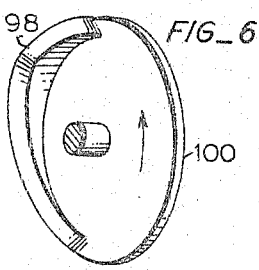
INVENTOR.
SALVADOR A. MINERA
BY
ATTORNEYS June 6, 1967  S. A. MINERA  3,323,571
FRUIT STEMMER AND METHOD
Filed Dec. 14, 1964  5 Sheets-Sheet 3
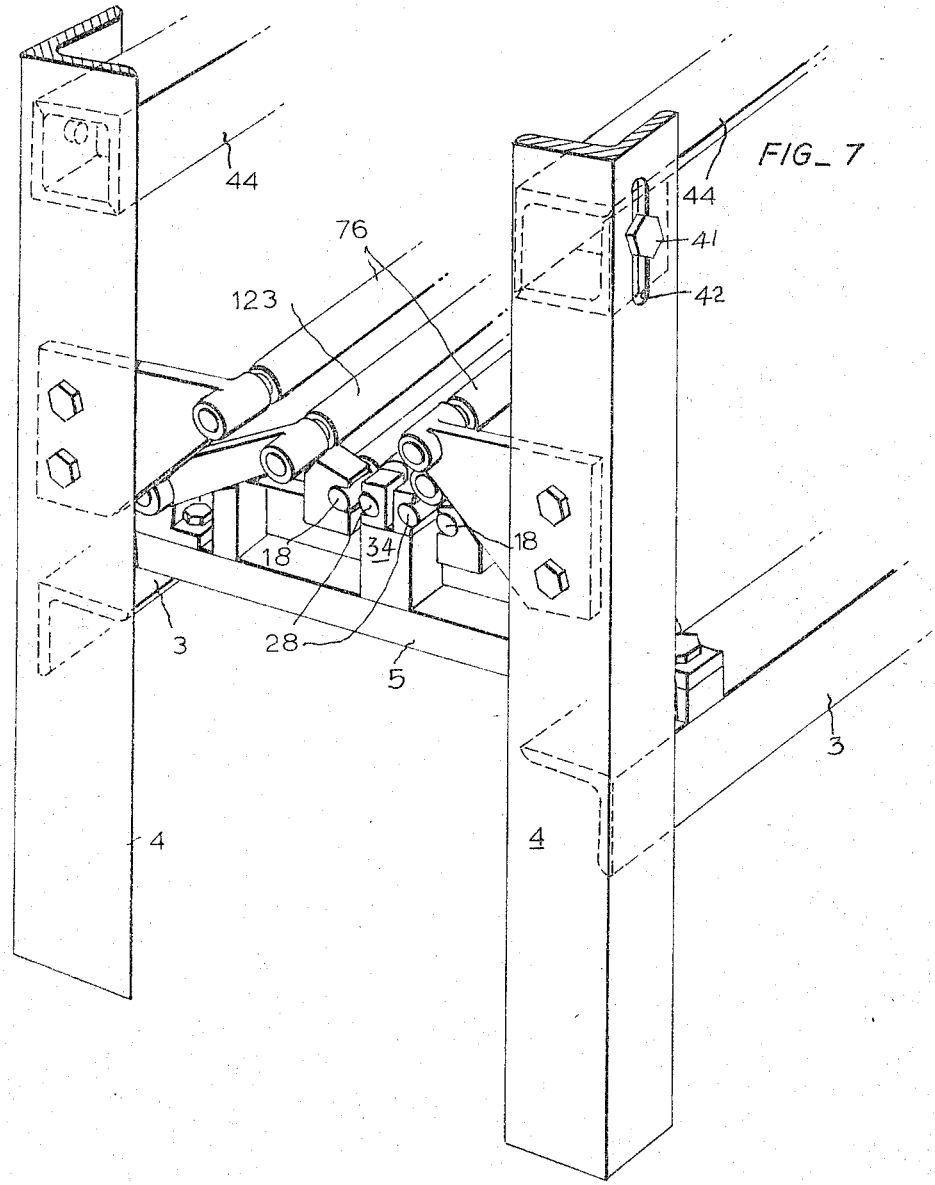
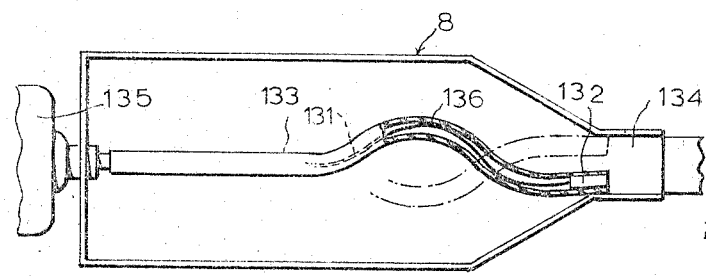
INVENTOR.
SALVADOR A. MINERA
BY
ATTORNEYS

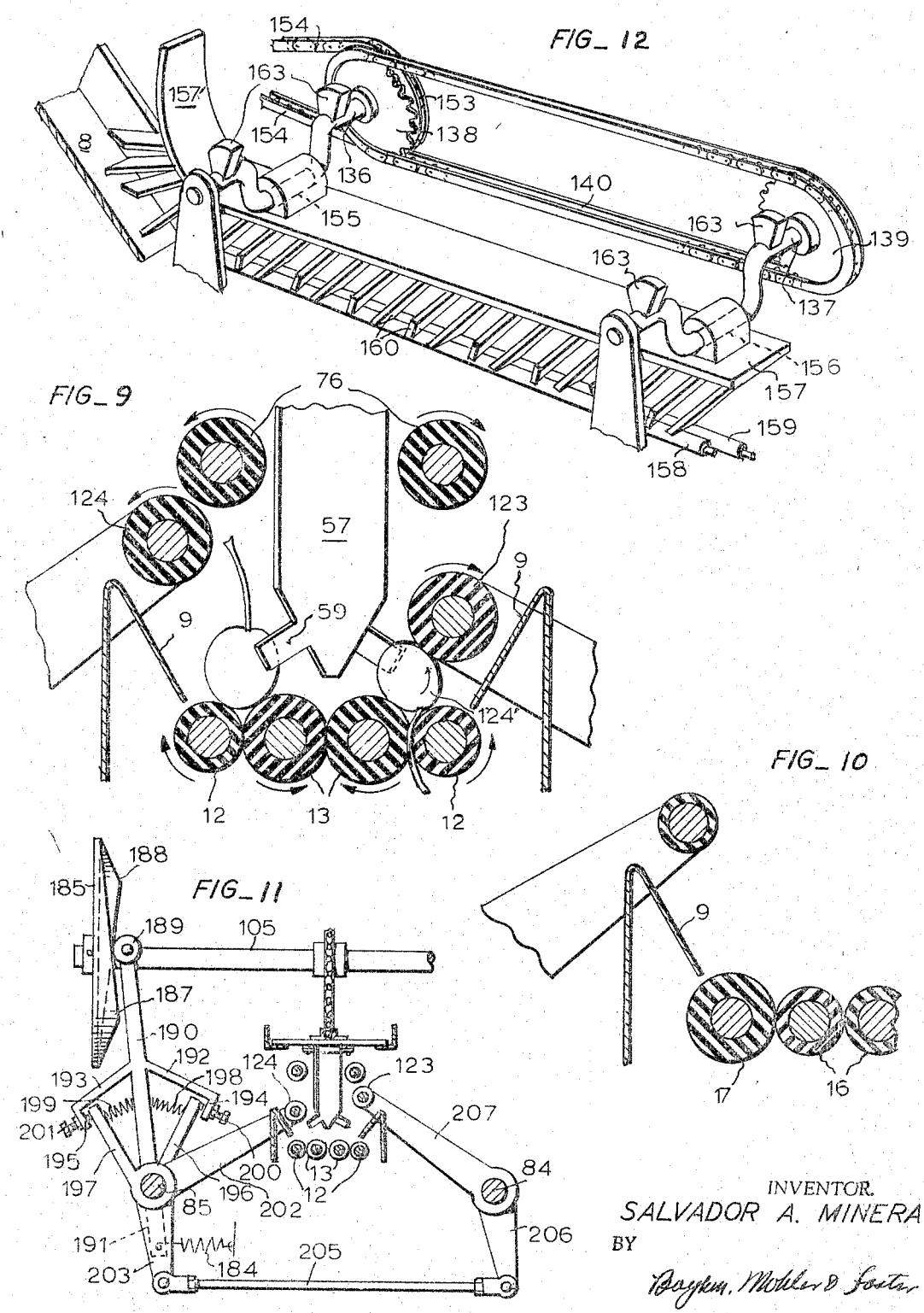

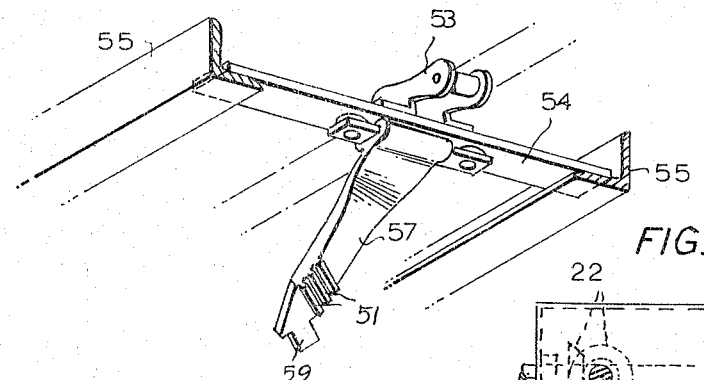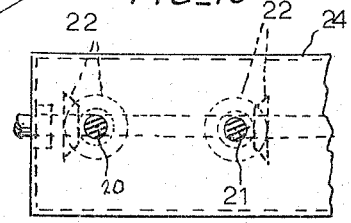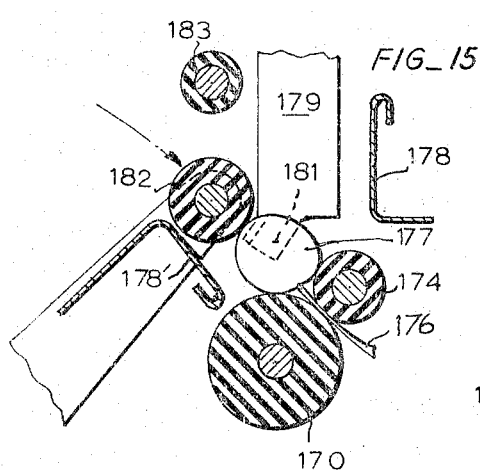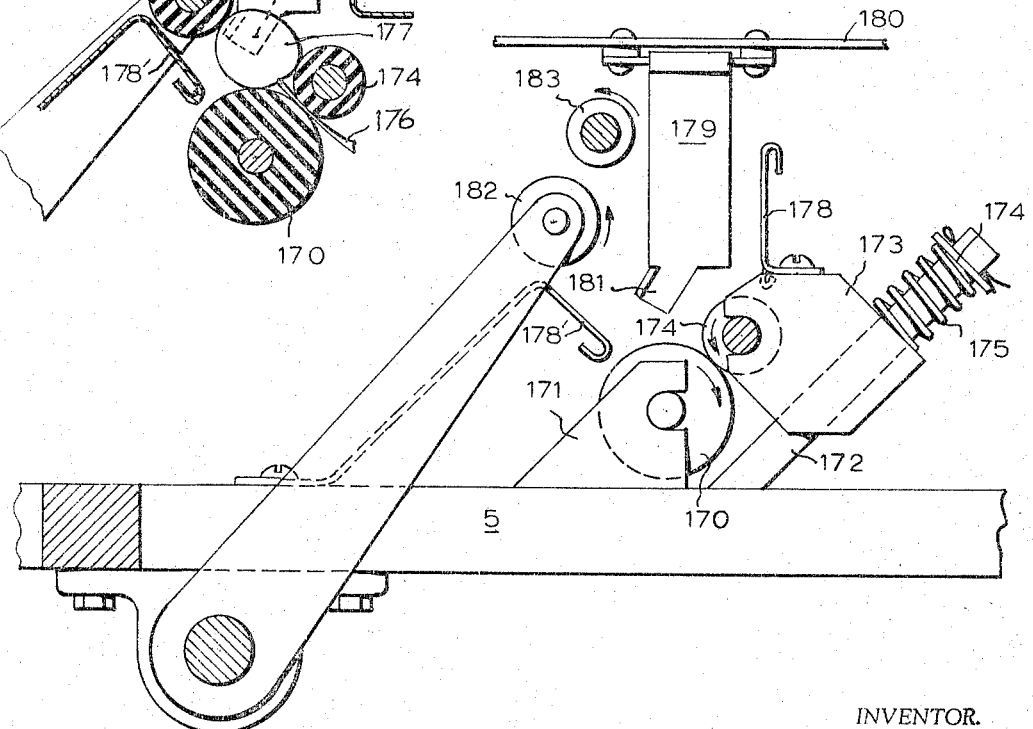
INVENTOR.
SALVADOR A. MINERA

United States Patent Office 3,323,571
Patented June 6, 1967

3,323,571
FRUIT STEMMER AND METHOD
Salvador A. Minera, 1921 Taraval St.,
San Francisco, Calif. 94116
Filed Dec. 14, 1964, Ser. No. 418,200
12 Claims. (Cl. 146—238)

This invention is an improvement on the fruit stemmer shown in my copending application Ser. No. 203,284, filed June 18, 1962, now Patent No. 3,176,739 and has for one of its objects the provision of a stemmer for cherries and the like that is more efficient than heretofore and that is adapted to quickly remove the most tenaciously attached stems from fruit without injury to the fruit or breakage of the stems.

Another object of the invention is the provision of a relatively small stemmer that is adapted to remove the stem from a very large number of cherries per hour, and which machine more efficiently removes said stems than heretofore.

A still further object of the invention is the provision of a method of removing the stem from fruit, such as cherries, olives, grapes, plums and the like that is more efficient than heretofore. It is to be understood that the invention is not necessarily restricted to cherries.

In machines for removing the stems from fruit, the general practice is to provide some means for gripping the stem of each fruit unit and the body of the fruit is then separated from the stem. The efficiency of the machine to a great extent depends upon how rapidly the stem of each fruit unit may be gripped, and how rapidly it is removed from the stem. In the case of substantially spherical fruit bodies, the stem may project from any side of the body while it is rolled or moved along a path of travel. The present invention provides means for causing the fruit bodies to rapidly vary the direction in which the stem projects so as to reduce to a minimum the chance for it to elude the stem-gripping members, thereby both shortening the time the fruit is carried by the stemmer before being stemmed, and also substantially eliminating the chance of the fruit not being stemmed. Furthermore, the more quickly the fruit is stemmed the less likely it is to be injured.

Another difficulty in fruit stemmers, as well as in other fruit handling machines, where chute-feeding of the fruit in files to the processing machines is employed, is the bridging jamming, and piling up of the fruit bodies where the files are formed.

In the present invention one of the objects is to prevent such bridging or jamming by very simple means that is easy to install and is trouble free.

Once the stems of the fruit units are gripped for separating the fruit from the stem, the main problem is in quickly separating each fruit unit from the stem. Inasmuch as the fruit units are of varying sizes and the stems are of varying lengths and the stems are attached to the fruit units, or to their pits, with varying degrees of tenacity, the fast and certain removal of the stems of substantially all of the fruit units without injury to the fruit, such as the pulling of the pits out of the fruit in the stemming operation or objectionably chafing the skins, or breaking the skins, or crushing the fruit, is a problem which the present invention has solved.

It should also be noted that the efficiency in stemming fruit units is also to a great extent dependent upon not injuring the stems before the cherries are separated therefrom as by shredding or sharply bending them. In the latter case the stems may break and in the former case the gripping means loses its purchase or its grip on the stems.

Machines embodying the invention hereinafter disclosed are used for stemming different kinds of fruit, such as plums, cherries, olives, grapes, etc. The problems in each kind of fruit may vary with the characteristics of the season, i.e. whether the season has been wet, dry, cold or hot. Also the same varieties of fruit have different stemming characteristics in different localities. In certain instances intermittent rolling of the fruit units along stem-gripping rollers has advantages.

The present invention provides a machine and method of stemming that is adapted to rapidly and efficiently stem various kinds of fruit of widely varying stemming characteristics whether or not the latter are due to various circumstances above cited and this is accomplished without injury to the fruit or breakage or shredding of the stems.

Other objects and advantages will appear in the description and drawings.

In the drawings:

FIG. 1 is a side elevational view of the machine, broken in length.

FIG. 2 is an enlarged cross-sectional view at generally line 2—2 of FIG. 1, but with certain parts omitted for clarity of explanation.

FIG. 3 is a fragmentary enlarged perspective view of a portion of the machine shown in FIG. 5.

FIG. 4 is a fragmentary, enlarged top plan view of a portion of the machine generally as seen from line 4—4 of FIG. 1.

FIG. 5 is a simplified cross-sectional view substantially at line 5—5 of FIG. 1.

FIG. 6 is a perspective view of one of the cams of FIG. 5, the cam shaft being shown in section.

FIG. 7 is a fragmentary enlarged isometric view of the discharge end of the machine showing the arrangement of the rollers, certain other parts being omitted.

FIG. 8 is an enlarged, top plan view, partly in cross section, showing the feed chute as seen from line 8—8 of FIG. 1.

FIG. 9 is an enlarged, cross-sectional view showing the arrangement of the rollers seen in FIG. 2.

FIG. 10 is a cross-sectional view of a modification of the structure shown in FIG. 9.

FIG. 11 is modification of structure shown in FIG. 5.

FIG. 12 is a fragmentary isometric view showing a modification of the overhead fruit moving means.

FIG. 13 is a fragmentary isometric view showing part of the fruit moving means of FIGS. 1, 2 in modified form.

FIG. 14 is an enlarged modification, in cross-section of the portion of the machine shown in FIG. 2.

FIG. 15 is a fragmentary cross-sectional view of some of the elements shown in FIG. 14 showing a different position of one of the fruit engaging rollers of FIG. 14.

FIG. 16 is a cross-sectional view illustrative of one form of the gear arrangement of the gear box at one end of the stemming rollers, as seen substantially along line 16—16 of FIG. 1 and which is applicable to the different forms of the invention, except for omission of several of the gears for the form shown in FIGS. 14, 15, in which only one pair of stemming rollers is shown.

In detail the present machine comprises a stationary frame, generally designated 1 (FIG. 1) that includes horizontally extending upper side frame members 2 and lower side frame members 3 parallel therewith spaced below said upper frame members. Legs 4 at the ends of said frame members support them above the floor. Suitable cross frame members 5 (FIGS. 2, 4, 7) may extend between said lower side frame members and a cross frame support 6 (FIG. 1) supports a motor 7 on the upper side frame members 2.

In FIG. 1 the feed end of the machine is at the left hand end, and a downwardly inclined feed chute 8 (FIGS. 1, 8) is adapted to feed cherries, or whatever fruit is to be stemmed, for downward movement to a point above one of the ends of a pair of horizontally elongated, side walls 9 (FIGS. 2, 9) that are convergent relative to each other transversely thereof in a downward direction. These walls may extend from the lower discharge end of chute 8 to the discharge or right hand end of the frame 1 and to a downwardly extending discharge chute 10 (FIG. 1) at the discharge end of the machine. These walls 9 will be described more in detail later on, but at this point it is sufficient to note that they are spaced apart at their lower horizontally extending edges, and said edges terminate close to and over the outermost rollers 12 (FIG. 2) of two pairs of parallel, horizontally extending stemming rollers that respectively engage inner stemming rollers 13 that, in turn, are parallel with and between the outermost rollers 12. Said inner stemming rollers may engage each other at their adjacent sides, although this is not essential, and all of these rollers have a relatively soft outer layer of rubber or rubber-like material, such as neoprene.

From the above, it is seen that walls 9 to a substantial degree define the lateral sides of a horizontally elongated trough, the bottom of which is the horizontally disposed pair of rollers 12, 13.

FIG. 9 is an enlarged, fragmentary sectional view through the roller assembly, showing the preferred form in which rollers 13 are of larger diameter than the outside rollers 12. FIG. 10 shows a modification in which inner rollers 16 are of larger diameter than outside rollers 17, only one of the outside rollers being shown in FIG. 10. Side walls 9 are of the same structure and arrangement, and the same numbers will be used where the same structure is used.

The outside or outer stemming rollers 12 are the driven rollers that include steel shafts 18 respectively connected by universal joints 19 (FIG. 4) with shafts 20, 21 that, in turn, extend into a gear box designated 24 (FIGS. 1, 4).

Motor 7 is connected by a chain 25 (FIG. 1) with a sprocket wheel 26 on shaft 27. The latter extends into the gear box 24 (FIG. 16) and connects, through pairs of bevel gears 22, with shafts 20, 21. The arrangement is such that the two outer rollers 12 are rotated oppositely for downward movement of their surfaces that engage the inner rollers 13. Since the inner rollers 13 are idlers, their opposed surfaces will move upwardly so that the fruit units that may tend to be supported on said inner pair of rollers will be moved onto one or the other of the pairs of rollers 12, 13. The fact that the inner rollers 13 are of larger diameter than the outer rollers contributes to movement of the fruit to opposite sides of the pair of rollers 13.

The above arrangement and operation of rollers 13, 14 are applicable to rollers 16, 17 of FIG. 10, and while the arrangement shown in FIGS. 2, 9 is preferable, it is obvious that the rollers could all be of the same diameter.

The gear box 24 shown in FIG. 16 is broken in length to indicate that any desired sets of stemming rollers, identical to the sets shown in FIGS. 2, 9, 10 may be included in a machine, and the elements associated with each set may be duplicated in the same arrangement as illustrated in the drawings. The fact that only one roller of each pair need be driven is an improvement over the necessity for driving all rollers, since there is no possibility of slippage between the rollers of each pair due to one being driven faster than the other.

The inner rollers 13 have steel shafts the same as the outer rollers, and the same is true of the rollers in FIG. 10. These shafts of the inner rollers are designated 28 to distinguish from the shafts of the outer rollers 12.

Outer bearings 29 (FIG. 2) rotatably support the ends of shafts 18 of the outer rollers 12, and they also carry the side walls 9.

Inner bearings 30 are stationary and rotatably support the ends of shafts 28, or the ends of the inner rollers 13. The opposed faces of the bearings for each pair of engaging rollers 12, 13 are open, so that the rollers may be laterally removed from the bearings 29, 30 upon movement of the bearings 29 laterally away from the bearings 30, without removing the bearings.

Said bearings 29 are supported for such movement away from bearings 30 on stationary horizontal rods 33 (FIG. 2) that project oppositely outwardly from stationary supports 34 respectively mounted on frame members 5, and which supports 34 also stationarily support the inner bearings 30.

Supported in recesses formed in the oppositely outwardly facing sides of the pair of outer bearings 29 are the ends of horizontally extending threaded bolts 35, the outer ends of which are rectangular in cross-sectional contour and formed with outwardly opening slots 36. Said outer ends of bolts 35 slidably extend through the forked upper ends of posts 37, and a stationary pin 38 on each of said upper ends extends through each slot 36. A spring 39 around each bolt 35 reacts between a centrally apertured member 40 secured on each post 37, and through which each bolt 35 slidably extends and a nut 43 threaded on each bolt for yieldably urging each bearing 29 toward the fixed bearing 30 adjacent thereto. The tension of the springs 39, and consequently the pressure of rollers 12 against the inner rollers 13 may be adjusted by adjusting nuts 43. Also, the construction enables quick removal of the bearings 29 and the walls 9 for servicing.

Thus it is that the rollers 12, 13 of each engaging pair will be held in yieldable engagement under a tension dependent upon the spacing between nut 43 and the member 40.

Also, by this arrangement, the walls 9 will move with the bearings 29 carrying the same, hence their positions relative to the rollers 12 respectively will remain the same and when the bearings 29 are retracted against the tension of springs 39, the walls 9 will move with the bearings so as not to interfere with removal of the inner rollers 13.

The driving arrangement for the machine is best shown in FIG. 1, as is the mounting for structure supporting the means for moving the fruit along the rollers.

Supported on a pair of parallel, horizontally extending, vertically adjustable side frame members 44 (FIGS. 1, 7) adjacent to the feed end of the machine are bearings 45 (FIG. 1) that rotatably support a shaft 46, which shaft has a sprocket wheel 47 secured thereto, and a similar pair of bearings 48 adjacent to the discharge end of the machine support a similar shaft 49 having a similar sprocket wheel 50 secured thereto.

An endless sprocket chain 53 extends over the sprocket wheels 50 and spaced links of said chain have transversely extending rigid elements 54 (FIG. 2) secured thereto, which elements project horizontally oppositely outwardly of said chain and the ends of the elements 54 on the lower rim of the chain are slidably supported on horizontally extending, parallel angle bars 55. The latter in turn are rigidly connected with the vertically adjustable side frame members 44 by any suitable means such as members 56 (FIG. 1). Bolts 41 (FIGS. 1, 7) at the ends of frame members 44 extend through vertically elongated slots 42 in legs 4 for adjusting the members 44 to different heights and for securing them in adjusted positions.

The elements 54 carry the means for agitating and rolling the fruit units along the pairs of stemming rollers 13, 12 and said means comprise spaced flexible strips 57 of rubber or rubberlike material, which strips depend from the lower run of chain 53 and are carried upwardly by the chain at the discharge end and back to the feed end to descend for again moving along the rollers 12, 13 toward the discharge end of the machine.

Strips 57 are similarly inclined rearwardly from the elements 54 in a downward direction along the lower run of chain 53 and alternate strips are at similar, but opposite angles, relative to the horizontal length of the lower run of chain 53. FIGS. 2, 13 show one of the strips at an angle relative to the length of the lower row of strips. Said lower row of strips is supported directly over the central inner rollers 13 and the lower end of each strip is generally of V-shape with the trailing or lowermost slanted lower edge 58 being formed with a laterally and downwardly inclined tab 59. The opposite inclined edge is leading relative to the direction of movement of the lower run of chain 53 and has no tab. These tabs project across the inner rollers 13 and function to shunt any fruit units on the central rollers 13 to one side or the other so that the fruit will be over one or the other pairs of stemming rollers. They also move the fruit units on the stemming rollers toward the discharge end of the machine. During such movement, the fruit units on the stemming rollers are kept in very active movement and fruit units on the outer rollers 12 will, of course, be kept on the pairs of rollers 12, 13 due to their direction of rotation. Said strips may or may not have ribs, such as shown at 51 (FIG. 13), thereon to engage the fruit.

Shaft 20 (FIG. 4) has a sprocket wheel 60 secured thereto and a similar sprocket wheel 61 secured on shaft 21. Spaced oppositely outwardly of the pair of shafts 20, 21 and outwardly of the pairs of stemming rollers 12, 13 are parallel shafts 63, 64 that are respectively rotatably supported at their ends in bearings 65, 66.

The shaft 63 has a sprocket wheel 67 secured thereon in a position opposite to sprocket wheel 61 while shaft 64 has a similar sprocket wheel 68 secured thereon opposite to the sprocket wheel 60. A sprocket chain 69 connects the sproket wheels 61, 67 and a similar chain 70 connects sprocket wheels 60, 68.

Also secured on shaft 63 is a second sprocket wheel 73 and a similar sprocket wheel 74 is secured on shaft 64.

Rigidly secured on each of cross frame members 5 are pairs of upwardly projected bearing supports 75 (FIGS. 1, 2, 4) having bearings 75′ at their upper ends that rotatably support a pair of rubber covered horizontal rollers 76 in positions parallel with the stemming rollers, and respectively positioned a substantial distance spaced above each set of stemming rollers.

The shaft 77 of one roller 76 has a sprocket wheel 78 secured thereon and the shaft of the other roller 76 has a sprocket wheel 79 secured thereto (FIG. 4). A chain 80 connects sprocket wheel 73 on shaft 63 with the sprocket wheel 78 on shaft 77 of one roller 76, while a sprocket chain 81 connects sprocket wheel 74 on shaft 64 with the sprocket wheel 79 on the other shaft 77 of the other roller 76.

By the above arrangement the rollers 76, which are equal heights above the respective pairs of stemming rollers 12, 13 will rotate so their lower surfaces move toward each other, to thereby tend to move any fruit that may engage them back onto the pairs of stemming rollers.

Bearings 66 secured on one of the ends of shafts 84, 85, which shafts, in turn, are coaxial with shafts 63, 64 and are rotatably supported at their ends on bearings 82, 83 on frame members 5 (FIGS. 4, 5). Each of these shafts 84, 85 has special crank arms secured thereto at one of either ends, the crank arms so secured on shaft 84 being generally designated 86 and those on shaft 84 being designated 87 (FIG. 5).

Oscillatably supported on shaft 84 at a point intermediate its ends on shaft 84 is an arm generally designated 88 (FIG. 5) while a corresponding arm 89 is similarly supported on shaft 85.

Arms 88, 89 extend generally vertically and the upper portions 90, 91 of arms 88, 89 are substantially longer than the portions 94, 95 that project below the shafts 63, 64.

The upper ends of arms 88, 89 have cam followers 96, 97 rotatably carried thereby, which followers are yieldably held against generally annularly extending cam tracks 98, 99 that are on the opposedly facing ends of circular cams 100, 101 (FIG. 5).

Cams 100, 101 are secured on the ends of a horizontal shaft 105 that, in turn, extends transversely of the machine and which shaft is rotatably supported at its ends in bearings carried by the side frame members 44. One of the ends of the shaft 105 has a pulley 106 (FIG. 1) secured thereon and this pulley is connected by a belt 107 with a pulley 108 secured on shaft 46 that carries sprocket wheel 47.

Springs 109 (FIG. 5) connect the lower ends of the arms 88, 89 below shafts 84, 85 with a rigid part of frame 1 for yieldably holding the cam followers 96, 97 against the cam tracks 98, 99.

The pair of crank arms 86 secured on shaft 84 comprises a relatively short generally vertically extending arm 102 and a longer arm 103 extending upwardly at less than a right angle to arm 102, while the pair of crank arms 87 comprises a short arm 112 and a longer arm 113, which arms extend at an angle to each other that is the same as the angle between arms 102, 103. The longer arms 103, 113 extend slantingly toward each other in an upward direction from shafts 84, 85 while shorter arms 102, 112 extend upwardly at an angle intermediate the angles respectively defined by arms 103, 88 and arms 113, 89. A pin 115 extends through openings formed in the upper portion 90 of arm 88 and the arm 102. An expansion spring 116 around pin 115 reacts between said portion 90 and arm 102 yieldably hold the upper ends of said portion and arm 102 extended to the extent permitted by head 117 on one end of pin 115 and a cotter pin secured on the other end of said pin.

A corresponding pin 119 and spring 120 associated with portion 91 of arm 89 and arm 112 functions to yieldably hold the upper ends of said portion and arm 112 spaced apart.

There are several sets of cranks 88, 89 respectively on each shaft 84, 85, and rollers 123, 124 respectively spaced therefrom at opposite sides of the lower ends of the lower row of strips 57 are rotatably supported in bearings at the outer ends of arms 103, 113.

A sprocket wheel 125 (FIG. 4) is secured on an extension of the steel core of roller 123 and a similar sprocket wheel 126 is secured on a similar extension of the steel core of roller 123 and a similar sprocket wheel 126 is secured on a similar extension of the steel core of roller 124. A sprocket wheel 127 is secured on shaft 63 opposite to sprocket wheel 125 and a sprocket wheel 128 is secured on shaft 64 opposite to sprocket wheel 126. A chain 129 connects sprocket wheel 126, 128.

By the above arrangement as the cam follower 96 approaches the high point on cam track 98 the roller 123 will swing generally downwardly toward and into yieldable engagement with cherries 124 (FIG. 9) on the rollers 112, 113, and these cam tracks are so arranged relative to each other that they alternately swing toward and away from the cherries that are respectively on the two sets of stemming rollers. FIG. 9 shows the arrangement and the above members are used in said figure for the swinging rollers 123, 124 described and with respect to the rollers 76. In the event of any unusual resistance being encountered by the rollers 123, 124 the springs 116, 120 will permit the rollers to yield and this yieldability of the rollers also prevents injury to larger fruit on the stem-gripping rollers.

The driving arrangement for the rollers 123, 124 is such that the cherries engaged thereby and pulled against the inner and outer stem-gripping rollers will be urged against the inner rollers and rotated in the same direction as the inner roller engaged thereby. It is important to note that the rollers 123, 124 rotate much faster than the stemming rollers 12, 13, preferably, approximately 25% faster, with the result that the cherries or fruit 124' when engaged thereby will be very quickly rotated about an axis that is generally perpendicular to the axes of the rollers when the cherries are pulled by their stems toward and against the stemming rollers.

This arrangement differs from that shown in my copending application Ser. No. 203,284, filed June 18, 1962, in that in the present instance the fruit bodies are positively and rapidly rotated by rotating rollers 123, 124 with the driving arrangement for rollers 123, 124 being such that these rollers are driven substantially faster than the stemming rollers. Inasmuch as the cherries or fruit bodies are very quickly drawn against the stemming rollers once the stem is engaged between the rollers, the cherries are easily and quickly separated from the stems irrespective of how tenaciously they may be connected with the pit or fruit.

The feed to the stemming rollers from chutes 8 is uninterrupted due to the use of an elongated rotary member 133 (FIG. 8) that extends longitudinally of the chute and into the contracted throat or lower end portion 134 of the latter. This member 133 may be a resilient tube connected at the upper end with a motor 135 or any other suitable driving means, and the lower end of said tube is permanently distorted as by a laterally projecting bend 136 that engages the bottom of the chute with each rotation of said member, so that the end of the member projecting into the contracted lower end of the chute will bounce around on the bottom of the chute. This structure prevents any pile up of fruit at the contracted end of the chute and the fruit units will be continuously fed onto the feed ends of the pairs of feed rollers. A wire 131 may be secured within tube 133 and bent to maintain the bend 136 while a weight 132 may be secured on the lower end of wire 131.

It has been mentioned that in some cases an intermittent sweeping of the fruit along the stemming rollers is desirable. FIG. 12 shows structure that may be substituted for the endless chain 53 to effect such sweeping of the fruit. Crank shafts 136, 137 are substituted for the shafts 46, 49, and instead sprocket wheels 138, 139, similar to sprocket wheels 47, 50 are secured on one of the corresponding ends of said shafts 136, 137 with a chain 140 connecting said wheels. A second sprocket wheel 153 on shaft 136 is connected by a chain 154 with a driven gear from a gear box 24 in the same manner as chain 25 (FIG. 1) is connected with the sprocket wheel 26.

Rotatably suspended below and from the cranks 155, 156 is a horizontally elongated strip 157 that is parallel with and spaced above the stemming rollores 158, 159 only one pair of rollers being shown in FIG. 12, although the same arrangement of rollers as shown in FIG. 2 may be used.

Strips 160 corresponding to strips 54, depend in downwardly and rearwardly slanting direction and alternately laterally inclined oppositely edgewise from the rigid supporting strip 157. The rigid supporting strip 157 and the flexible strips 160 that depend therefrom are counterbalanced by weights 163 on the crank shafts, and the strip 157 curves upwardly at the feed end of the machine, as indicated at 157' and this curved portion also carries strips 160 in an arcuate continuation of the row below the strip support 157.

Upon rotation of the sprocket wheels 138, 139 in the same direction as the sprocket wheels 47, 50 of FIG. 1 the row of strips 160 will be intermittently moved in its lower position toward the discharge end of the stemming rollers so as to intermittently sweep the cherries or other fruit on the stemming rollers toward the discharge end of the machine. Between such sweeping movement the row of strips 60 will be elevated above the cherries and moved back toward the feed end of the machine for another sweeping movement. It should be noted that each sweeping movement will also jostle and change the positions of fruit on the stemming rollers so as to change the positions of the stems that otherwise might not be caught between the stemming rollers, or that would be delayed in becoming caught.

FIG. 3 shows a means for adjusting the tension of the springs 116, 120. Only the one set of arms 113, 91 is shown, since the particular structure involved is merely the substitution of an adjustable threaded bolt 164 for pin 119. Instead of head 117 of the bolt engaging the arm 91 as in FIG. 4, a pair of nuts 165 is threaded on the shank of bolt 164, one nut being a lock nut. Thus by adjusting the nuts 165 along the bolt the tension of spring 166 between the arm 113 and arm 91 may be varied. Also the cam follower 167 at the upper end of arm 91 may be supported between the spaced arms 168 of a yoke that extends laterally from the upper end of arm 91.

The above structure of FIG. 3 is applicable to the other similar structure on shaft 84.

FIGS. 14, 15 show structure in which a single pair of stemming rollers is used.

In this form of the invention a single horizontal stemming roller 170 is rotatably supported in bearings 171 on frame members 5, each of which bearings is open at one side for ready removal of the roller. Upwardly and outwardly similarly inclined rods 172 slidably support bearings 173 that, in turn, are generally alongside bearings 171, and that are open at their sides generally facing the open sides of bearings 171. These bearings 173 rotatably support the power driven stemming roller 174, and springs 175 respectively around rods 172 react between the upper side of each bearing 173 and a pin held washer 174 to yieldably urge the roller 173 into engagement with roller 171. The roller 174 drives roller 171 and the direction of rotation of the rollers is indicated by the arrows in FIG. 14 so that the stems 176 (FIG. 15) of cherries 177 that are caught between the rollers will pull the cherries against the upper surface of rollers 170 and the laterally facing surface of roller 174.

A vertical, horizontally extending wall 178 is secured on bearings 173 and extend thereabove to retain the cherries on the stemming rollers, and a wall 178' carried on frame members 5 extends slantingly upwardly and outwardly from roller 170 for the same purpose.

The flexible fruit moving and deflecting strips 179 that depend from elements 180 that, in turn, correspond to elements 54, are similar to the strips 57 except that they are generally rectangular and while inclined downwardly and rearwardly relative to the direction of movement thereof from the feed to the discharge ends of the stemming rollers, they are not alternately twisted or inclined, but insead, only a downward extension 181 on each strip is slanted relative to the direction of movement of said strips so as to deflect the cherries or fruit generally toward the roller 174.

A roller 182 corresponding to roller 124 of FIG. 5 is mounted and actuated for movement in the same manner as roller 124 to intermittently engage and rotate the cherries 177 against roller 174. An upper roller 183 corresponds in structure, movement and function to roller 76 of FIG. 5.

The modification of the stemmer of FIGS. 1, 2 insofar as driving the rollers 174, 182 and 183 is concerned, is believed to be obvious to anyone skilled in the art.

The employment of the larger diameter and smaller diameter roller in each of the pairs of engaging stemming rollers not only enables the driving of the pair by driving one of the rollers only, and also by this arrangement shorter stems will be caught between the pairs of rollers.

FIG. 11 shows a modification of the means for swinging the rollers 123, 124. In FIG. 5 two cams 100, 101 are shown, while in FIG. 11 one cam 185 on shaft 105 is all that is required, said cam having a cam track 186 for the risers 187, 188. The cam follower 189 that is on the single crank arm 190 rides on the cam track and the extension 191 below shaft 85 is connected by a spring 184, that, in turn, functions to yieldably hold the follower against the cam track.

Arm 190 has a pair of arms 192, 193 rigid therewith and extending to opposite sides thereof. Between the outer end portions 194, 195 of arms 192, 193 extend the upwardly projecting portions of crank arms 196, 197, and springs 198, 199 are disposed between arm 190 and the upper ends of said crank arms 196, 197 to yieldably urge said upper ends against the inner ends of adjusting screws 200, 201 threadedly extending through said outer end portions 194, 195 of arms 192, 193.

Crank arm 196 is rigid with the arm 202 that carries roller 124 while crank arm 197 is rigid with arm 203 that, in turn, is pivotally connected by a link 205 with the lower end of a crank arm 206 that is supported on and depends from shaft 84. This arm 206 is rigid with the arm 207 that carries roller 123.

It is apparent that the springs 198, 199 function to perform the same results as springs 116 and 120 of FIG. 5 to yieldably urge rollers 123, 124 into engagement with the cherries on the pairs of rollers 12, 13.

It is to be understood that the hereinabove detailed description of the apparatus is not to be considered restrictive of the invention, since it will be apparent that the invention is capable of variations and modifications from the forms shown, so that the scope thereof should be limited only by the scope of the claims appended hereto.

I claim:

1. A fruit stemming machine for stemming a fruit body, such as a cherry and the like, that has a stem projecting therefrom, comprising:
   (a) a pair of substantially horizontally disposed rollers in side by side engaging relation supported for rotation about substantially parallel horizontally extending axes for movement of their engaging sides in the same direction to thereby grip said stem therebetween and to pull said body toward and against said rollers upon said body being positioned at one side of the rollers of said pair;
   (b) roller supporting means supporting said pair of rollers for said rotation thereof;
   (c) roller rotating means connected with at least one roller of said pair for so rotating the rollers of said pair;
   (d) body engaging means adjacent to said pair of rollers having a body engaging surface adapted to engage one side of said body and movable transversely relative to said axes upon such engagement between said body engaging surface and said body for rotating said body about an axis generally parallel with said axes when said body is pulled against said rollers to thereby separate said stem from said body;
   (e) means connected with said body engaging means for moving said body engaging surface thereon into said engagement with said body when the latter is so pulled toward and against said rollers, and for so moving said body engaging surface.

2. In a stemmer as defined in claim 1:
   (f) one of the rollers of said pair being of substantially greater diameter than the other roller thereof and said roller supporting means supporting said rollers in a position for supporting said body for rolling on said pair of rollers longitudinally of the latter;
   (g) said body engaging means being an elongated member spaced from and substantially parallel with said pair of rollers in side by side relation to the latter for movement into said engagement with such body at any point along said pair of rollers.

3. In a stemmer as defined in claim 2:
   (h) said elongated member being a roller;
   (i) means connected with said last mentioned roller for rotating the latter at a higher rate of speed than the rotation of the other roller of said pair.

4. A fruit stemming machine for stemming fruit bodies, such as cherries and the like, that have stems projecting therefrom, comprising:
   (a) two pairs of horizontally extending bodies supporting rollers in parallel, side by side relation and disposed generally in a horizontal plane to provide a pair of inner rollers adjacent to each other and a pair of outer rollers at opposite sides of said pair of inner rollers, for supporting a plurality of said bodies thereon;
   (b) means supporting the body supporting rollers of said outer pair with their surfaces in frictional driving engagement with the surface of the roller of said inner pair that is adjacent thereto at the adjacent sides of said outer rollers and each last mentioned inner roller;
   (c) means connected with said rollers for rotating the rollers of said inner pair and said outer pair for downward movement of said last mentioned adjacent engaging sides of said inner and outer rollers whereby the stems on fruit bodies supported on said inner and outer rollers will be gripped between said inner rollers and said outer rollers when said bodies are supported on said inner and outer rollers and are rolled thereon longitudinally thereof;
   (d) a pair of body engaging elements extending longitudinally of said rollers respectively supported for movement toward and away from bodies on said body supporting rollers in a direction transversely of said axes of said body supporting rollers for intermittent engagement with and for rotation of the said bodies about axes extending generally parallel with the axes of said body supporting rollers to thereby separate the bodies from stems gripped between rollers of said pairs;
   (e) means connected with said body engaging elements for so moving the latter.

5. In a stemmer as defined in claim 4:
   (f) said body engaging elements being elongated rollers in spaced side by side relation to said body supporting rollers;
   (g) means connected with said last mentioned rollers for rotating them when they are in engagement with said bodies.

6. In a construction as defined in claim 4:
   (f) said means connected with said body engaging elements supporting the latter for yieldable movement relative to bodies engaged thereby to enable said elements to yield upon engagement with such bodies upon a predetermined pressure against the latter.

7. A fruit stemming machine for stemming fruit bodies, such as cherries and the like, that have stems projecting therefrom, comprising:
   (a) two pairs of horizontally extending body supporting rollers in parallel, side by side relation and disposed generally in a horizontal plane to provide a pair of inner rollers adjacent to each other and a pair of outer rollers at opposite sides of said pair of inner rollers, for supporting a plurality of said bodies thereon;
   (b) means supporting the body supporting rollers of said outer pair with their surfaces in frictional driving engagement with the surface of the roller of said inner pair that is adjacent thereto at the adjacent sides of said outer rollers and each last mentioned inner roller;

(c) means connected with said rollers for rotating the rollers of said inner pair and said outer pair for downward movement of said last mentioned adjacent engaging sides of said inner and outer rollers whereby the stems on fruit bodies supported on said inner and outer rollers will be gripped between said inner rollers and said outer rollers when said bodies are supported on said inner and outer rollers and are rolled thereon longitudinally thereof;

(d) body moving means supported above said inner rollers for movement longitudinally of the latter for engagement with and for rolling of said bodies longitudinally of said inner and outer rollers from substantially one of the ends of said rollers to the other;

(e) said body moving means including a row of spaced members having yieldable body engaging portions alternately extending from points over said inner rollers generally toward the outer rollers at opposite sides of said pair of inner rollers for engaging bodies on said rollers and for deflecting bodies on said inner pair of rollers to positions supported on each adjacent pair of inner and outer rollers;

(f) means conencted with said body moving means for moving said members thereof longitudinally of said rollers.

8. In a construction as defined in claim 7:

(g) a pair of body engaging elements extending longitudinally of said rollers respectively supported for movement toward and away from bodies on said body supporting rollers in a direction transversely of said axes of said body supporting rollers for intermittent engagement with and for rotation of the said bodies about axes extending generally parallel with the axes of said body supporting rollers to thereby separate the bodies from stems gripped between rollers of said pairs.

9. A fruit stemming machine for stemming fruit bodies, such as cherries and the like, that have stems projecting therefrom, comprising:

(a) two pairs of horizontally extending body supporting rollers, in parallel side by side relation and disposed generally in a horizontal plane to provide a pair of inner rollers adjacent to each other and a pair of outer rollers at opposite sides of said pair of inner rollers for supporting a pair of rows of fruit bodies respectively on said inner rollers and each of said outer rollers;

(b) means supporting each of said outer rollers in yieldable frictional engagement with the inner roller adjacent thereto whereby rotation of one roller of each pair so in engagement with each other will effect rotation of the other roller;

(c) roller rotating means connected with said one roller of each engaging pair for rotating the latter in a direction for downward movement of their adjacent surfaces whereby the stems of fruit bodies on said body supporting rollers engaged between said adjacent surfaces will be drawn generally downwardly to pull the bodies connected therewith against the rollers of each engaging pair;

(d) body engaging elements respectively alongside and spaced from and above said outer rollers outwardly of said two pairs thereof supported for generally oscillatory movement toward and into engagement with one of the sides of fruit bodies in said pair of rows thereof on said body supporting rollers and away from the latter for moving said bodies transversely relative to the axes of said body supporting rollers for separating said bodies from the stems thereof that are gripped between the pairs of engaging rollers;

(e) means for alternately moving said body engaging elements into said engagement with fruit bodies on said body supporting rollers while said rollers are rotated by said roller rotating means;

(f) body moving means supported above said inner rollers and between said body engaging elements for movement longitudinally of said rollers substantially from end to end of the latter for engaging and moving fruit bodies on said rollers longitudinally of the latter during said rotation of said rollers and during said movement of said elements into and out of engagement with said fruit bodies;

(g) means connected with said body moving means for so moving the latter.

10. In the combination as defined in claim 9:

(h) a pair of upper rollers spaced above the outer rollers of said pair and extending longitudinally of the latter and spaced from each other in parallel side by side relation supported for rotation in directions for movement of their lower surfaces toward each other for moving bodies engaged thereby to positions over said body supporting rollers, and (i) means connected with said upper rollers for so rotating them.

11. In a fruit stemming machine for stemming fruit bodies, such as cherries and the like, having stems projecting therefrom, comprising:

(a) a pair of horizonally extending rollers in parallel, side by side engaging relation for supporting said bodies thereon for movement longitudinally of said rollers in one direction;

(b) means supporting said pair of rollers for rotation about their axes;

(c) means connected with said rollers for rotating them for movement of their adjacent engaging surfaces generally downwardly whereby stems gripped therebetween will be pulled downwardly for separation from the fruit bodies connected with said stems;

(d) fruit moving means above said pair of rollers including a row of spaced yieldable members extending longitudinally of said rollers supported for movement of said row of elements longitudinally of said rollers in said one direction;

(e) a feed chute at one end of said pair of rollers having a bottom wall and a delivery end over one end of said pair of rollers for supporting fruit bodies for rolling over said bottom wall and through said delivery end onto said one end of said pair of rollers;

(f) an elongated flexible element supported on said bottom for rotation about its longitudinal axis and having a laterally offset portion at one end thereof extending into said delivery end for engagement with and agitation of bodies of fruit adjacent to and in said delivery end to prevent jamming of said fruit bodies in said chute; and (g) means connected with said flexible element at the end thereof opposite to said one end of said element for so rotating the latter.

12. The method of stemming a cherry and the like having a stem attached thereto and projecting therefrom that comprises the steps of;

(a) pulling said stem between a pair of horizontally elongated cylindrical surfaces in side-by-side yieldable engagement moving about parallel axes substantially in the same direction at the adjacent sides of said cylindrical surfaces away from the cherry attached to said stem whereby said cherry will be drawn to said surfaces, (b) applying a yieldable force against said cherry for moving the latter in one direction longitudinally of and along said elongated cylindrical surfaces upon said cherry being separated from said stem, (c) frictionally engaging a side of said cherry intermittently by a continuously rapidly rotating surface moving about an axis extending substantially parallel with said axes by alternately moving said rapidly rotating surface into and out of said frictional engagement with said side of said cherry and in a direction toward and away from one surface of said pair of cylindrical surfaces for rotating said cherry about an axis parallel with said axes when said cherry is drawn to said one surface of said pair of surfaces to separate said cherry from said stem, whereby said cherry will be free from said rapidly rotating surface to roll along said pair of elongated cylindrical surfaces longitudinally of the latter under said yieldable force after said cherry has been separated from said stem.

References Cited
UNITED STATES PATENTS 3,036,613  5/1962  Minera _____ 146—55
3,176,739  4/1965  Minera _____ 146—238

WILLIAM W. DYER, Jr, *Primary Examiner.*

W. G. ABERCROMBIE, *Assistant Examiner.*